United States Patent

[11] 3,613,101

[72] Inventors Eugene Leonard
Sands Point;
Edgar Wolf, New Hyde Park; Francis C. Marino, Huntington; Wolfgang F. Heine, Huntington Station, all of N.Y.

[21] Appl. No. 4,457
[22] Filed Jan. 21, 1970
[45] Patented Oct. 12, 1971
[73] Assignee Digitronics Corporation
Albertson, N.Y.
Continuation of application Ser. No. 674,788, Oct. 12, 1967, now abandoned, which is a continuation of application Ser. No. 350,346, Mar. 9, 1964, now abandoned.

[54] MAGNETIC RECORDING UTILIZING A SELECTIVE MAGNETIC SHIELDING STRUCTURE
11 Claims, 11 Drawing Figs.

[52] U.S. Cl. 346/74 M, 179/100.2 E, 235/61.12 M
[51] Int. Cl. G11b 5/86, G11b 5/70, G01d 15/12, G06k 19/00
[50] Field of Search 346/74 M, 74 MP; 179/100.2 E, 100.2 CF; 235/61.12 M

[56] References Cited

UNITED STATES PATENTS

| | | | |
|---|---|---|---|
| 3,075,194 | 1/1963 | Gray | 346/74 |
| 3,100,834 | 8/1963 | Demer | 235/61.12 |
| 3,146,455 | 8/1964 | Cutaia | 346/74 |
| 3,210,527 | 10/1965 | Daykin | 235/61.11 |

*Primary Examiner*—Bernard Konick
*Assistant Examiner*—Gary M. Hoffman
*Attorney*—Yuter & Fields

ABSTRACT: A method and apparatus for recording digital data on a magnetic tape magnetically shields discrete areas of the tape. The shielded tape is then exposed to a magnetic field to change the magnetic state of the unshielded areas. There are two types of shielding: negative shielding wherein the tape is shielded at all places except where the data is to be recorded; and positive shielding where only those places of the tape where the data is to be recorded are shielded.

INVENTORS
Eugene Leonard
Edgar Wolf
Francis C. Marino
Wolfgang F. Heine

BY Yuter & Spiecens
ATTORNEYS

MAGNETIC RECORDING UTILIZING A SELECTIVE MAGNETIC SHIELDING STRUCTURE

The present application is a continuation of our copending application Ser. No. 674,788, filed Oct. 12, 1967, for Magnetic Recording, now abandoned; which, in turn, was a continuation of then copending U.S. application Ser. No. 350,346, filed Mar. 9, 1964, for Magnetic Recording, now abandoned.

The present invention relates to methods and apparatus for recording discrete or digital information on a magnetizable medium.

Such information recording contemplates a process wherein predetermined stable states of magnetization in a magnetizable record medium represent specific values or units of information. Generally, one stable state of magnetization is employed to represent a binary "1" and another stable state is employed to represent binary "0." The stable states usually can be classified as positive magnetization, negative magnetization or neutral magnetization. It should be apparent that only two of the three states are required to represent the two possible values of a binary unit (bit) of information. Although it is possible to employ the neutral state and either of the other states, it is preferable to use the positive and negative states for better signal discrimination.

Digital recordings are employed in data processing systems in their input, output and particularly, storage organs. High sophistication in magnetic recording techniques has been achieved, especially so with respect to the storage organs, particularly the working and backup memories of digital computers employing "on the fly" magnetic recordings. Nevertheless, there is still not available a simple, inexpensive process or means for providing static or quasi-static magnetic recordings which are utilizable in manually operable input devices.

One such class of input devices can be termed a "point-of-transaction" recorder. Such recorders are widely used at present in credit card systems. Other applications concern the processing of information on attendance badges, file cards, roll charts, etc. Credit card systems will be discussed in greater detail, since they are a striking example of a system having its weak link at the input end of the system. In a typical credit card system, the credit card serves as a "stencil" for supplying information, usually by the printing of embossed characters (fixed information, i.e. card holder's name, address, identification number) on a record medium. The variable information, i.e. the amount of the transaction, is usually handwritten on the record medium. The record medium is then forwarded to an operator who converts the recorded information into machine-readable language, generally by key punching perforatable cards or tapes, which are fed to the processing part of the system. Thus, there is considerable human labor and expense involved in getting the information from the point of transaction into the processor.

Many attempts have been made employing mechanical perforators and the like at the point of transaction. However, such devices are, generally, too complex and expensive for the typical point of transaction such as a gasoline station. Attempts have also been made to employ magnetic-recording techniques. However, these attempts either required "on the fly" processes entailing complex apparatus or, if static, likewise required complex apparatus usually entailing a source of electrical energy. Furthermore, many of the point-of-transaction input devices are subject to environmental abuses, and have, for this reason, employed expensive components.

In determining the type of point-of-transaction input device to be employed in a system, one must consider which of the many forms of information representation is most advantageous for entry into the processor. Since most high speed data processors today are designed to work with magnetic tape units as gross input devices, it is advantageous to employ magnetic recordings in the point-of-transaction input devices.

It is accordingly an object of the invention to provide an improved method of magnetic recording.

It is another object of the invention to provide an improved method of magnetic recording that can be carried out manually.

It is a further object of the invention to provide a method of magnetic recording, requiring simple and inexpensive apparatus, which is essentially immune to environmental abuse, and yet provides reliable record media suitable for direct high-speed input into a data processor.

It is yet another object of the invention to provide simple and inexpensive apparatus for carrying out the methods of the invention.

Broadly, the invention contemplates the recording of digital data on a magnetizable medium by magnetically shielding discrete areas of the medium, the areas forming a pattern representative of the data, and then subjecting the medium to a magnetic field so as to change the magnetic state of the shielded areas. There are two types of shielding: negative shielding and positive shielding. Negative shielding contemplates shielding the medium at all places except where the data is to be recorded. Positive shielding contemplates shielding the medium only at those places where the data is to be recorded.

Other objects, features and advantages of the invention will be pointed out in the following detailed specification of which the claims form a part, and illustrated in the accompanying drawings, which show, by way of example, and not limitation, the principle of the invention and preferred modes for applying that principle.

Figures 1, 2:
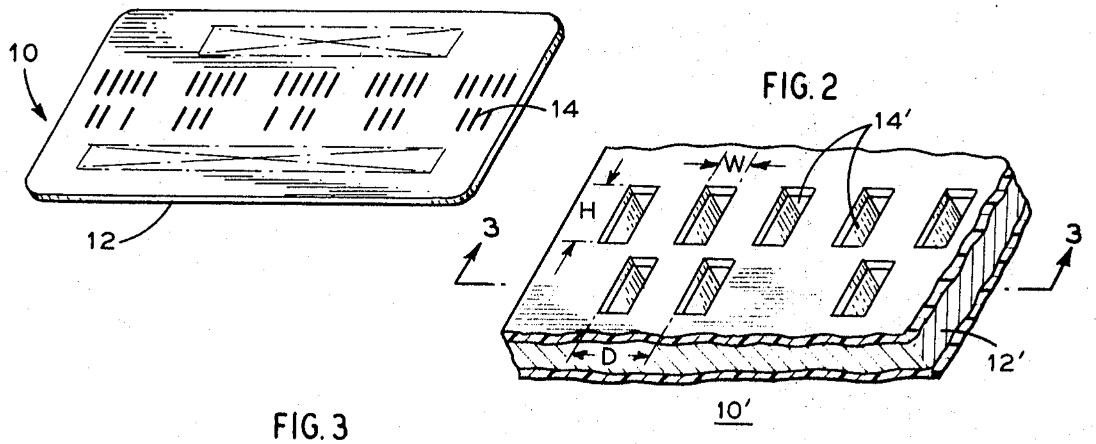
FIG. 1 shows a top view of a stencil employing a ferromagnetic medium used in magnetic recording in accordance with the invention.
FIG. 2 is an expanded fragmentary view of a negative-shielding embodiment of the stencil of FIG. 1 showing the recording elements in greater detail.

In FIG. 1 there is shown a shielding stencil 10 for magnetic recording, in exemplary form, as a credit card. The stencil 10 includes recording elements 14 in a laminar base 12.

The shape of elements 14 will determine the shape of the recorded areas. In the exemplary embodiment of FIG. 1, rectangular-shaped elements are used since the recording desired will be two series of longitudinally displaced transverse lines on a magnetic tape wherein one series (the upper series in FIG. 1) are to be transduced as "sprocket" (synchronizing) pulses and the other series (the lower) are to be transduced as a coded combination of information bits. It should be noted that McGraw-Hill). elements could be in the shape of characters and particularly of the shape adopted by the American Banking Association for checks.

Figure 3:
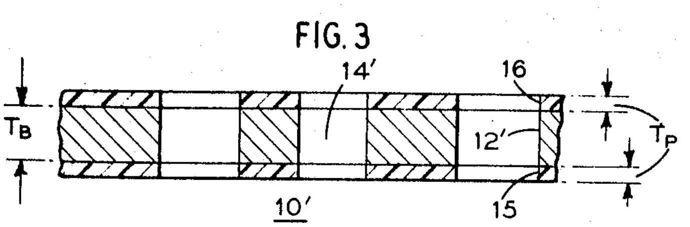
FIG. 3 is a sectional view taken along the lines 3—3 of FIG. 2 for showing details of the stencil.

In FIGS. 2 and 3 portions of a negative-shielding embodiment of the stencil 10 are shown as stencil 10′ comprising a laminar base 12′ of a magnetically soft ferromagnetic material such as Mumetal. Mumetal is composed of: 71 to 78 parts of nickel; 4.3 to 6 parts of copper; 0 to 2 parts of chromium; and the remainder iron (See page 155 "Magnetic Recording Techniques" by Stewart McGraw-Hill). Other magnetically soft materials with relatively high intrinsic saturation flux density and relatively low coercivity, i.e. less than 4 oersteds, can also be employed. For instance, SAE010–10 cold rolled steel will serve. The recording elements 14′ are slitlike holes or openings punched or cut in laminar base 12′.

For mechanical safety reasons, sheetlike overlays 15 and 16 of nonmagnetic material cover the laminar base 12′. Such overlays are used partially to protect laminar base 12′ as well as to prevent the scratching of the magnetic coating of the magnetic tape against which the stencil 10′ is placed as is hereinafter described.

The theory and methods of the invention will now be described with respect to FIG. 4 wherein the same reference characters are used for similar components. There are four components involved: permanent magnet 18 (source of a magnetic field); stencil 10′ including elements 14′ in the laminar base 12′ of Mumetal (or equivalent); magnetic tape 20 (magnetizable medium); and a spacer 22 of nonmagnetic material. Magnet 18 can be a pair of C-shaped Alnico cores butted together with a front gap $G_F$ and a rear gap $G_R$. Although abutting C-shaped cores are shown, it should be apparent that other shapes such as bar magnets or even electromagnets could be employed. The size of magnet 18 with respect to its gaps is distorted so that the drawings do not become excessively large.

Initially, magnetic tape 20 can be unmagnetized, i.e., in the neutral stable state of magnetization. The stencil 10′ is then placed against magnetic tape 20. In FIG. 4, stencil 10′ is placed on top of magnetic tape 20. Accordingly, elements 14′ are positioned in close proximity with the magnetizable medium or magnetic tape 20. Magnet 18 is then moved from, say, left to right across spacer 22, i.e., the source of a magnetic field is placed in close proximity to the magnetizable medium (magnetic tape 20) and elements 14′. Slotted channel 24 provides a sliding guide for handle 26 which may be grasped manually or mechanically for driving the magnet 18 across spacer 22. It should be noted that the sliding of magnet 18 across spacer 22 can be replaced by a step of merely bringing the magnetic tape 20 under the influence of the magnetic field. Furthermore, magnet 18 could be slid from right to left. In addition, instead of these longitudinal movements of magnet 18 with respect to magnetic tape 20, transverse movements are possible. As will be hereinafter described, any one of these movements will change the state of magnetization of those portions of the magnetic tape 20 under elements 14′ to another stable state while leaving the state of magnetization of the portions not under elements 14′ in FIG. 4 unchanged. There are, therefore, magnetization discontinuities in the tape 20.

The amplitude of these discontinuities can readily be doubled. Instead of beginning with magnetically neutral tape, the magnetization in magnetic tape 20 is initially saturated in one direction, say, negatively. Then, with the elements 14′ in place, magnet 18 or other suitable source of a magnetic field is brought in close proximity with the magnetic tape 20. The direction of the magnetic field is oriented to saturate the magnetic tape 20 in the opposite direction. This can be accomplished in several ways.

First, magnetic tape 20 may be prebiased so that it is saturated with its magnetization being aligned longitudinally, say, from right to left. Stencil 10′ is then placed in position and magnet 18 is then moved across the spacer 22. Or with magnetic tape 20 prebiased from right to left and stencil 10′ placed in position, both tape 20 and stencil 10′ are moved past fixed magnet 18.

Second, without stencil 10′ in place, magnet 18 is moved across spacer 22 aligning the magnetization everywhere in magnetic tape 20 from right to left. Then stencil 10′ is placed in position and the magnet 18 is rotated 180° and moved once more across spacer 22. Thus, the magnet 18 has been first used to bias the magnetic tape 20 and then used again to reverse the flux selectively through the stencil 10′.

What is believed to be the phenomenon involved will now be described with reference to FIG. 4. In FIG. 4 the fringing magnetic flux from gap $G_F$ represented by the dotted lines F passes from the positive pole (+) of magnet 18 via spacer 22 and enters laminar base 12′. It fringes from the left edge of element 14′ into region 20A of magnetic tape 20 and back via the right edge of element 14′ to the negative pole (−) of magnet 18, via spacer 22. If an element 14′ is not opposite gap $G_F$ the soft ferromagnetic material opposite the gap $G_F$ completely shunts the flux from the positive pole (+) to the negative pole (−) before it can reach, say, the portion 20B of magnetic tape 20. Accordingly, if magnetic tape 20 were initially unmagnetized, portion 20B remains unmagnetized and portion 20A is longitudinally magnetized from right to left. If magnetic tape 20 were initially magnetized from left to right, portion 20B remains longitudinally magnetized from left to right and portion 20A is longitudinally magnetized from right to left. Thus, the state of magnetization of the regions of magnetic tape 20 opposite elements 14′ are unshielded by stencil 10′ and have their state of magnetization changed whereas the remainder of the tape 20 is shielded by stencil 10′ and remains in its original state of magnetization.

Figure 5:
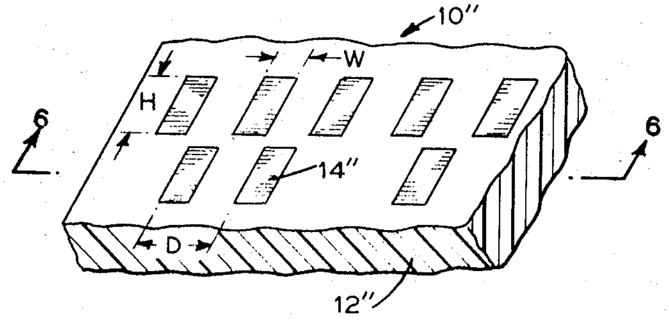
FIG. 5 is an expanded fragmentary view of the positive shielding embodiment of the stencil of FIG. 1 showing the recording elements in greater detail.
Figure 6:
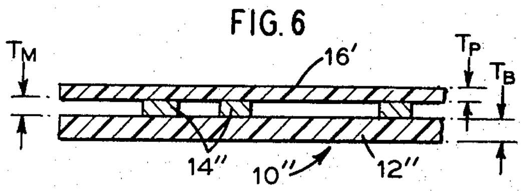
FIG. 6 is a sectional view taken along the line 6—6 of FIG. 5 for showing details of the stencil.

In FIGS. 5 and 6 there is shown the details of a positive shielding stencil 10″ for magnetic recording, in exemplary form, as a credit card. The stencil 10″ includes a laminar base 12″ of preferably semirigid nonmagnetic material. Affixed to the base 12″ by adhesion or imbedding and adhesion are elements 14″ of a magnetically soft ferromagnetic material such as Mumetal. For mechanical safety reasons a thin sheetlike overlay 16′ of nonmagnetic material covers the elements 14″ for their protection as well as to protect the magnetic tape when recording.

Figures 8, 9:
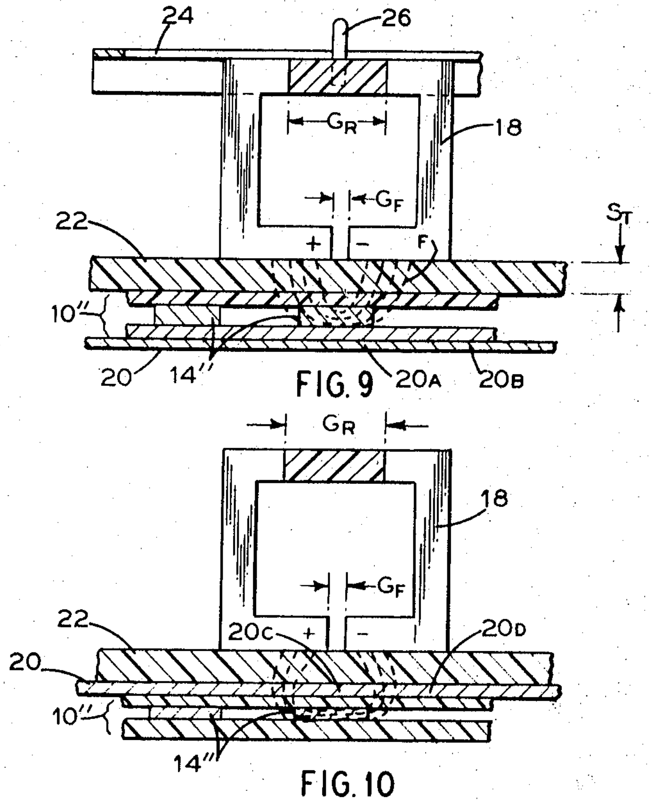
FIG. 8 is a sectional view showing other apparatus for carrying out the methods of the invention and in particular the operative disposition of a source of a magnetic field, a positive-shielding embodiment of the stencil and the magnetizable medium.
FIG. 9 is a sectional view of another apparatus embodiment, generally similar to that of FIG. 8 but with the positions of the stencil and the magnetizable medium interchanged with respect to the source of a magnetic field.

FIGS. 8 and 9 show the apparatus for the recording operation. Since the recording operation is the same as described above only the actual phenomenon involved will be described.

What is believed to be the phenomenon involved will now be described with reference to FIGS. 8 and 9. In FIG. 8 the fringing magnetic flux from gap $G_F$ represented by the dotted lines F passes from the positive pole (+) of magnet 18 via spacer 22 and is almost completely shunted by an element 14″ past the portion 20A of magnetic tape 20, and back via spacer 22 to the negative pole (−) of magnet 18. When a portion of magnetic tape 20 such as portion 20B is under gap $G_F$ the flux lines F leaving positive pole (+) pass through spacer 22, enter the tape 20, pass longitudinally therethrough, and in leaving magnetic tape 20, pass through spacer 22 to the negative pole (−). Hence, a portion 20A is uninfluenced by the fringing flux while a portion such as 20B is influenced. In other words, the element 14″ shunts the field so that the portion 20A is shielded. Portion 20A is shielded from magnetic flux. Accordingly, if magnetic tape is initially unmagnetized, portion 20A remains unmagnetized and portion 20B is longitudinally magnetized from right to left. If magnetic tape were initially magnetized longitudinally from left to right, portion 20A remains longitudinally magnetized from left to right and portion 20B is longitudinally magnetized from right to left.

Consider now the situation wherein magnetic tape 20 is located between magnet 18 and stencil 10″ as shown in FIG. 9. In such a case, the fringing flux leaves the positive pole (+), passes through spacer 22 and mostly perpendicularly through magnetic tape 20, entering element 14″. It longitudinally passes through element 14″ and perpendicularly back through magnetic tape 20 to the negative pole (−) via spacer 22. Accordingly, element 14″ shunts the major portion of the flux F around portion 20C. There is negligible flux passing longitudinally through portion 20C and it is thus "shielded" from receiving magnetic flux by providing a low reluctance bypass structure. The action at portion 20D is the same as at portion 20B of FIG. 4.

Therefore, it should be apparent that the role of element 14″ is to maintain unchanged, by a shunting or shielding action, the state of magnetization of its neighboring portion of magnetic tape 20, when influenced by a magnetic field. In other words, element 14″ acts as a magnetic shunt or shield. In this respect it has been found that for good results the element 14″ should not magnetically saturate when under the influence of the magnetic field, but the magnetic field should change the state of magnetization of unshielded portions of the magnetic tape 20. Accordingly, the strength of the magnetic field in the region of element 14″ is generally controlled by the spacer 22 by the choice of magnetic strengths of the magnets, gap size, and pole piece shape.

In other words, the field should be strong enough to affect tape 20 but not too strong so as to magnetically saturate elements 14″, or the saturation flux density of elements 14″ should be great enough so that elements 14″ are not magnetically saturated by a magnetic field passing therethrough. (The choice of the nature and thickness of the shielding material 12 is importantly affected by extraneous manufacturing and economic considerations.)

Figure 7:
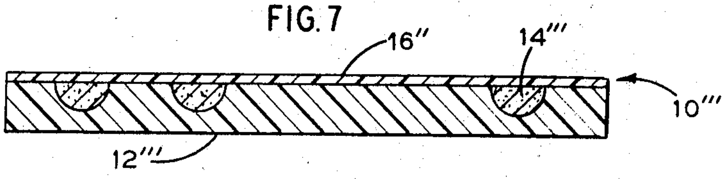
FIG. 7 shows a sectional view of another positive-shielding embodiment of the stencil wherein cavities in a nonmagnetic material are filled with a powder of magnetically soft material.

FIG. 7 shows a side view of a variation of the positive-shielding embodiment of stencil 10 of FIGS. 5 and 6. Stencil 10‴ has a base 12‴ of nonmagnetic material with a plurality of cavities which are filled with a fine powder of magnetically soft material to provide elements 14‴. A cover 16‴ of nonmagnetic material seals the powder in the cavities.

Magnetic recording with the stencil of FIG. 7 can be performed using any of the methods previously described. It is important that interparticle spaces in the powder be kept to a minimum to offer a reasonably continuous magnetic shield.

Figure 4A:
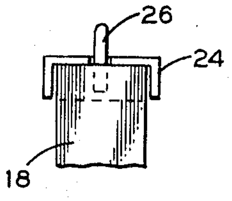
FIG. 4A is a fragmentary side view of the apparatus of FIG. 4.
Figure 4:
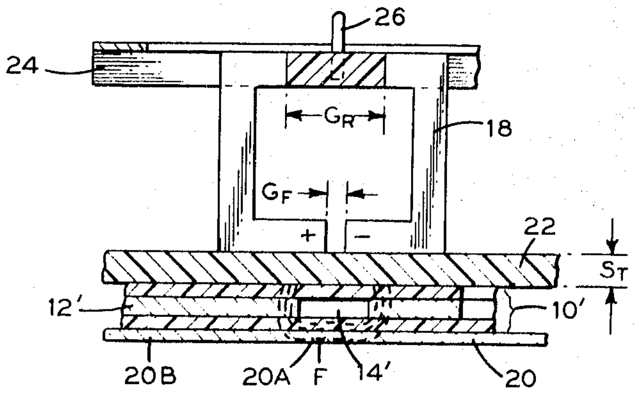
FIG. 4 is a sectional view showing apparatus for carrying out the methods of the invention, and in particular the operative disposition of a source of a magnetic field, the negative-shielding embodiment of the stencil and the magnetizable medium.
Figure 10:
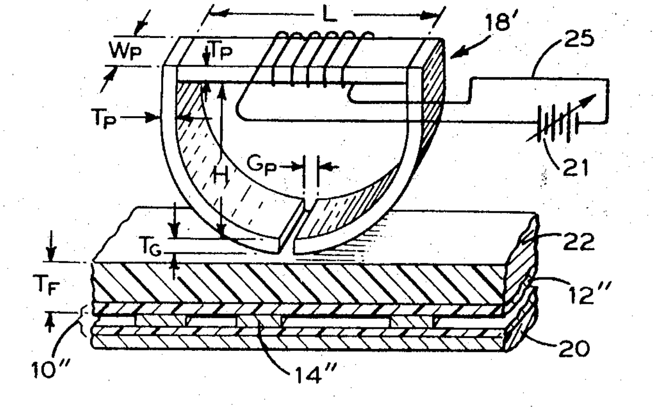
FIG. 10 shows a perspective view, similar to FIGS. 8 and 9 of an apparatus embodiment, wherein an electromagnet is used as a source of the magnetic field.

In FIG. 10 there is shown an alternate embodiment of the apparatus of FIG. 8, the only difference being that the permanent magnet 18 of FIG. 4 is replaced by the electromagnet 18′ having a winding 19 connected to a source of current 21. The apparatus operates in the same manner as the apparatus of FIG. 8 and will not be discussed in detail. It should be noted that when the applicable parameters given in the Appendix were used, good recordings were obtained as is shown in the following table:

| Winding Current (I amperes) | Gap Flux Density ($B_G$ GAUSS) | Operating Spacing ($T_F$ inches) |
|---|---|---|
| 0.100 | 3,333 | 0.032 |
| 0.150 | 5,000 | 0.062 |
| 0.300 | 10,000 | 0.093 |

It should be noted the actual operating fringing flux density is difficult to estimate, but is believed to be about 1,000 gauss. It should also be noted that the operating spacing $T_F$ is the perpendicular distance from bottom edge of the gap $G_P$ to the top of the elements 14″ and is therefore equal to the sum of the thickness of the spacer 22 and the thickness of the base 12″.

There has thus been shown improved methods of magnetic recording which use preformed configurations of magnetically soft material to shunt the flux of a magnetic field past discrete portions of a magnetizable medium for establishing discontinuities of magnetization therein, wherein the discontinuities represent recorded information. It should be noted that shunting or shielding elements are more reliable than using permanent magnet type elements which are subject to degaussing by transient magnetic fields.

Such a method can easily be incorporated in a credit card system wherein the credit card carries the shunting or shielding elements. The credit card is then placed on an erased or, preferably, prebiased magnetic tape and a magnet is moved across the card and tape. There is then recorded on the tape a coded combination of magnetic discontinuities representing the information on the card.

In addition, there have been shown various embodiments of stencils which perform the shunting or shielding function as well as apparatus for carrying out the methods of the invention.

While only a limited number of embodiments of the invention have been shown and described in detail there will now be obvious to those skilled in the art many modifications and variations which satisfy many or all of the objects but which do not depart from the spirit of the invention. For example, although the magnet 18 has been described as moving across the magnetic tape 20 it is possible for the magnet 18 to remain stationary and for the magnetic tape 20 and stencil 10 to be moved.

A working embodiment of the apparatus of FIG. 8 had the following parameters:

Magnet 18

| | |
|---|---|
| Type of material | Alnico V |
| Pole dimensions | 1.00×0.38 inches |
| Front gap $G_F$ | 0.005 inch |
| Rear gap $G_R$ | 0.030 inch |

Stencil 10

| | |
|---|---|
| thickness $T_B$ of base 12 | 0.030 inch |
| thickness $T_P$ of overlay 16 | less than 0.003 inch (0.0015 preferred) |
| thickness $T_M$ of element 14 | 0.004 inch |
| height H of element 14 | 0.080 inch |
| width W of element 14 | 0.012 inch |
| distance D between elements 14 | 0.031 inch |
| thickness $S_T$ of spacer 22 | 0.100 inch |
| type of material for element 14 | Mumetal |
| Initial permeability | 20,000 to 100,000 (maximum) |
| Coercivity | 0.05 oersteds |
| Retentivity | 6,000 gauss |
| $B_{max}$ | 7,200 gauss |

Magnetic tape 20

| | |
|---|---|
| Intrinsic Coercivity | 230 to 250 oersteds (approximately) |
| Retentivity | 800 to 1050 gauss (approximately) |

Note: Many magnetic tapes satisfying these parameters are manufactured under the name "SCOTCH" Brand by the Minnesota Mining and Manufacturing Company.

Electromagnet 18′

| | |
|---|---|
| Type of Material | Cold-rolled steel |
| Number of Turns of Winding 19 | 2,000 |
| Transverse width of magnet $W_P$ | 1.00 inch |
| Thickness of magnet $T_P$ | 0.25 inch |
| Length of winding Core L | 1.50 inch |
| Height of magnet H | 1.38 inch |
| Thickness of magnet at gap $T_G$ | 0.13 inch |
| Width of gap $G_P$ | 0.03 inch |

What is claimed is:

1. A method of longitudinally recording digital data comprising the steps of providing a strip of continuously magnetizable material, shielding areas of the strip of magnetizable material with a planar pattern which is related to the digital data to be recorded, and then changing the magnetic state of the magnetizable material in the longitudinal direction in the unshielded portions of said strip by subjecting the strip of magnetizable material to a magnetic field having a component which traverses the strip in the longitudinal direction.

2. The method of claim 1, wherein all of the strip of magnetizable material except discrete regions where the digital data is to be recorded are shielded.

3. The method of claim 1, wherein only the discrete regions of the magnetizable material where the digital data is to be recorded are shielded.

4. A method of digital magnetic recording on a continuously magnetizable medium having a first stable state of magnetization comprising the steps of positioning a magnetic shielding stencil having shielding and nonshielding regions lying in the same plane substantially against said magnetizable medium, and moving in close proximity to said magnetizable medium and to said magnetic shielding stencil a source of a magnetic field having a strength sufficient to establish a second stable state of longitudinal magnetization in said magnetizable medium but insufficient to magnetically saturate said magnetic shielding stencil so that the portions of said magnetizable medium in close proximity to the shielding regions remain in said first stable state and the portions of said magnetizable medium in close proximity to the nonshielding regions are switched to the second stable state.

5. A method of digital recording on a sheetlike magnetizable medium including a surface portion, comprising the steps of: providing a source of a magnetic field having a given field strength sufficient to establish stable states of magnetization in said magnetizable medium, moving said source adjacent to and across the surface portion of said magnetizable medium from a first region to a second region of the surface portion according to a given path for establishing a first stable state of longitudinal magnetization in that part of said magnetizable medium along said given path, positioning a magnetic shielding stencil of magnetically soft material, which is magnetically unsaturable by said magnetic field, opposite one surface portion of said magnetizable medium, said stencil having shielding and unshielding portions along said given path, and moving said source of a magnetic field across the surface portion from said second region to said first region along said given path so that at least a portion of said magnetic field traverses the medium in the longitudinal direction for establishing a second state of magnetization only in those portions of the magnetizable medium along said given path which are adjacent the unshielding portions of said magnetic shielding stencil.

6. The method of claim 5, wherein the direction of the magnetic field is different for each of the two movements of the source of the magnetic field.

7. Apparatus for magnetic recording on a continuously magnetizable medium having a predetermined state of magnetization comprising selective magnetic shielding means positioned in close proximity to the magnetizable medium for selectively shielding portions of the magnetizable medium, a source of a magnetic field having a component which is adapted to traverse the medium in a longitudinal direction and having a strength sufficient to establish a different state of longitudinal magnetization only in the unshielded portions of the magnetizable medium, and means for guiding said source of magnetic field to move in close proximity to the magnetizable medium.

8. The apparatus of claim 7, wherein said selective magnetic shielding means is a planar member of magnetically soft material having a saturation flux density such that it is unsaturable by the magnetic field of said source and including discrete regions with a material discontinuity which lie in the same plane as the magnetically soft material for providing less magnetic shielding than the remainder of said member to establish said different state of longitudinal magnetization in the portions of the magnetizable medium opposite said discrete regions.

9. The apparatus of claim 8, wherein said discrete regions are openings in said planar member.

10. The apparatus of claim 7, wherein said selective magnetic shielding means is a planar member of nonmagnetic material including discrete elements of magnetic material lying in the same plane as said nonmagnetic member and having a saturation flux density such that they are unsaturable by the magnetic field of said magnetic field source.

11. The apparatus of claim 10, wherein said discrete elements are cavities in said sheetlike member filled with powdered magnetic material.